United States Patent
Astrom et al.

(10) Patent No.: US 10,548,040 B2
(45) Date of Patent: Jan. 28, 2020

(54) CONTROL OF RADIO RESOURCE MANAGEMENT MEASUREMENTS

(71) Applicant: Telefonaktiebolaget LM Ericsson (publ), Stockholm (SE)

(72) Inventors: Magnus Astrom, Lund (SE); Bengt Lindoff, Bjarred (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 84 days.

(21) Appl. No.: 15/570,954

(22) PCT Filed: Jul. 26, 2017

(86) PCT No.: PCT/EP2017/068865
§ 371 (c)(1),
(2) Date: Oct. 31, 2017

(87) PCT Pub. No.: WO2019/020179
PCT Pub. Date: Jan. 31, 2019

(65) Prior Publication Data
US 2019/0059011 A1 Feb. 21, 2019

(51) Int. Cl.
*H04W 24/10* (2009.01)
*H04W 72/10* (2009.01)
(Continued)

(52) U.S. Cl.
CPC .......... *H04W 24/10* (2013.01); *H04B 17/318* (2015.01); *H04L 5/0048* (2013.01); *H04W 72/10* (2013.01)

(58) Field of Classification Search
CPC combination set(s) only.
See application file for complete search history.

(56) References Cited

U.S. PATENT DOCUMENTS

2008/0268843 A1* 10/2008 Ore .................. H04W 36/0061
455/435.3
2009/0042601 A1 2/2009 Wang et al.
(Continued)

OTHER PUBLICATIONS

PCT International Search Report, dated Apr. 4, 2018, in connection with International Application No. PCT/EP2017/068865, all pages.
(Continued)

*Primary Examiner* — Yee F Lam
(74) *Attorney, Agent, or Firm* — Leffler Intellectual Property Law, PLLC (57) ABSTRACT

A method of a wireless communication apparatus is disclosed, for measurement control of a wireless communication device (WCD) configured to communicate using either of a plurality of radio access technologies (RAT:s). The method comprises identifying that a first criterion is fulfilled for radio resource management (RRM) in relation to two or more of the RAT:s, and causing the WCD to execute a wireless communication scan to detect wireless communication signaling associated with the two or more RAT:s. When wireless communication signaling is detected for at least two of the two or more RAT:s, the method comprises assigning a priority value to RRM measurements of each of the at least two RAT:s based on one or more parameters related to the respective RAT, and causing the WCD to execute RRM measurements based on the priority values. Corresponding arrangement, WCD, network node and computer program product are also disclosed.

29 Claims, 2 Drawing Sheets

(51) Int. Cl.
*H04B 17/318* (2015.01)
*H04L 5/00* (2006.01)

(56) References Cited

U.S. PATENT DOCUMENTS

| | | | | |
|---|---|---|---|---|
| 2009/0088160 | A1* | 4/2009 | Pani | H04W 36/30 |
| | | | | 455/436 |
| 2015/0358845 | A1* | 12/2015 | Chapman | H04W 24/08 |
| | | | | 455/67.11 |
| 2016/0119840 | A1* | 4/2016 | Loehr | H04W 72/0446 |
| | | | | 370/331 |
| 2016/0295623 | A1* | 10/2016 | Kazmi | H04W 76/14 |
| 2017/0231011 | A1* | 8/2017 | Park | H04W 72/0446 |
| 2018/0192426 | A1* | 7/2018 | Ryoo | H04W 24/10 |

OTHER PUBLICATIONS

PCT Written Opinion, dated Apr. 4, 2018, in connection with International Application No. PCT/EP2017/068865, all pages.
3GPP TSG RAN 1 Meeting #86bis, R1-1609387, Lisbon, Portugal, Oct. 10-14, 2016, AT&T, Initial Access and Mobility Requirements for NR, 6 pages.
3GPP TSG-RAN WG2 Meeting #95bos, R2-166337, Kaohsiung, Oct. 10-14, 2016, ZTE, ZTE Microelectronics, Consideration on the RRM Measurement for NR, 4 pages.
3GPP TSG-RAN WG2 NR Ad-hoc#2 Meeting, R2-1706428 (Update of R2-1704507), Qingdao, China, Jun. 27-29, 2017, Samsung, RRM measurement bandwidth in NR, 5 pages.

\* cited by examiner

CONTROL OF RADIO RESOURCE MANAGEMENT MEASUREMENTS

TECHNICAL FIELD

The present disclosure relates generally to the field of wireless communication. More particularly, it relates to control of radio resource management (RRM) measurements in wireless communication systems.

BACKGROUND

The fifth generation (5G) wireless communication concept denoted as New Radio (NR) is a further evolution of the fourth generation (4G) wireless communication concept denoted Long Term Evolution (LTE). LTE and other legacy cellular wireless communication concepts are typically deployed on carrier frequencies below 3 GHz, while NR is designed for use on carrier frequencies up to, and even above, 20 GHz. In NR, carrier frequencies above 6 GHz are mainly intended for hot spot scenarios, while carrier frequencies below 6 GHz are intended also for macro deployment.

NR allows for tight integration with LTE, e.g. considering seamless handover with short interrupt times in the communication. Tight NR-LTE integration provides for the possibility to gradually deploy NR on the same carrier frequencies as LTE. Due to such deployment flexibility, it is will typically be preferable if multi-RAT wireless communication devices (WCD:s; e.g. User Equipments (UE:s)) are capable to simultaneously monitor more than one RAT to provide good mobility performance; both from a system capacity perspective and from a user quality of service (QoS) perspective. For example, a WCD capable of both NR and LTE communication should preferably be able to monitor both NR and LTE in relation to mobility.

The monitoring capability for each RAT may preferably be related to one or more carrier frequency and/or more than one frequency band. Furthermore, capability to simultaneously monitor two or more RAT:s may preferably include a capability to monitor different RAT:s using the same carrier frequency and/or the same frequency band as well as a capability to monitor different RAT:s using different carrier frequencies and/or different frequency bands.

Mobility in LTE typically relies on reception by the WCD of synchronization signals (primary synchronization signal (PSS) and secondary synchronization signal (SSS)) and reference signals (cell specific reference signals (CRS)). The synchronization signals (PSS/SSS) are transmitted by network nodes every 5 ms and the reference signals (CRS) are transmitted by network nodes in every slot. The synchronization signals (PSS/SSS) are typically used for cell detection and identification and the reference signals (CRS) are typically used for signal strength measurements (e.g. reference signal received power (RSRP)). Radio resource management (RRM) measurements are performed using the 6 resource blocks located in the center of the system bandwidth (BW) in LTE.

Mobility in NR typically also relies on reception by the WCD of synchronization signals. However, the synchronization signals may typically be transmitted every 20 ms in NR (PSS/SSS that will be used for cell search will be transmitted every 20 ms; PSS, SSS and PBCH (Physical Broadcast CHannel) will constitute a sync signal (SS) block that will be transmitted in beams in different directions within a 5 ms interval of the 20 ms period). RRM measurements may be performed using mobility pilot signals in NR, which mobility pilot signals may be transmitted with a configurable time interval. The synchronization signals and the mobility pilot signals may not be transmitted in the central part of the system BW for NR. The synchronization signals and the mobility pilot signals in NR may instead be transmitted using absolute frequency values defined in the standard, or may be transmitted using frequency values configured by the serving network node (NWN; e.g. a gNodeB).

Thus, different mobility measurement procedures are needed for NR and LTE in a multi-RAT WCD. To this end, it should be noted that the measurement unit(s) in a WCD typically constitute a finite resource. Hence, the WCD is typically only capable to measure a finite number of RAT(s) per time unit; the measurement in relation to each RAT relating to a number of carrier frequencies, a number of cells, and/or a number of transmission beams.

Due to such (and/or other) circumstances the complexity of RRM measurements may become quite high. In some situations, the complexity of RRM measurements may, for example, implicate requirements that are cumbersome, or even impossible, for the wireless communication device to satisfy.

Therefore, there is a need for approaches to RRM measurement control when NR and LTE are co-existing.

It should be noted that, even though these two RAT(s)—LTE and NR—are used for exemplification herein, similar problems may arise and embodiments may be equally applicable in any scenario where RRM measurements need to be performed for two or more RAT:s.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above or other disadvantages.

According to a first aspect, this is achieved by a method of a wireless communication apparatus, wherein the method is for measurement control of a wireless communication device which is configured to communicate using either of a plurality of radio access technologies (RAT:s).

The method comprises identifying that a first criterion is fulfilled for radio resource management (RRM) in relation to two or more of the RAT:s, and causing the wireless communication device to execute a wireless communication scan to detect wireless communication signaling associated with the two or more RAT:s.

When wireless communication signaling is detected for at least two of the two or more RAT:s, the method also comprises assigning a priority value to RRM measurements of each of the at least two RAT:s, wherein a first priority value indicates precedence over a second priority value, and causing the wireless communication device to execute RRM measurements based on the priority values.

Each priority value is based on one or more parameters related to the respective RAT, the one or more parameters comprising a frequency of RRM measurement opportunities of the RAT.

The assigning may, in some embodiments, comprise assigning the first priority value to RRM measurements of a first RAT having a first frequency of RRM measurement opportunities and assigning the second priority value to RRM measurements of a second RAT having a second frequency of RRM measurement opportunities when the first frequency of RRM measurement opportunities is lower than the second frequency of RRM measurement opportunities.

According to some embodiments, the method may further comprise adjusting the priority values based on the RRM measurements.

In some embodiments, the method may further comprise (for at least one of the two or more RAT:s) identifying that a second criterion is fulfilled for RRM in relation to two or more carrier frequencies of the RAT, and causing the wireless communication device to execute the wireless communication scan to detect wireless communication signaling also associated with the two or more carrier frequencies, wherein assignment of the priority value to RRM measurements of the at least one RAT also relates each of the two or more carrier frequencies.

Executing RRM measurements based on the priority values may, in some embodiments, comprise, for each RRM measurement opportunity, executing RRM measurements having the first priority value before RRM measurements having the second priority value.

Executing RRM measurements based on the priority values may, in some embodiments, comprise, when RRM signaling coincides for the at least two RAT:s, executing RRM measurements having the first priority value before RRM measurements having the second priority value.

Executing RRM measurements based on the priority values may, in some embodiments, comprise executing RRM measurements having the first priority value more often than RRM measurements having the second priority value.

According to some embodiments, the one or more parameters related to the respective RAT may further comprise one or more of:
 a signal strength metric of the wireless communication signaling associated with the RAT,
 a carrier frequency of the wireless communication signaling associated with the RAT,
 a Doppler frequency estimation of the wireless communication signaling associated with the RAT,
 a hardware resource requirement for the wireless communication device associated with communication according to the RAT,
 a traffic pattern of the RAT, and
 a type of the RAT.

Identifying that the first criterion is fulfilled for RRM in relation to two or more RAT:s may, according to some embodiments, comprise detecting that a signal strength metric in relation to a currently used RAT falls below a signal strength threshold.

In some embodiments, the wireless communication apparatus may be the wireless communication device which is served by a network node. Then, causing the wireless communication device to execute the wireless communication scan comprises executing the wireless communication scan, and causing the wireless communication device to execute RRM measurements based on the priority values comprises executing the RRM measurements.

When the wireless communication apparatus is the wireless communication device, assigning the priority value to RRM measurements of each of the at least two RAT:s may comprise receiving a priority indicating signal from the network node.

When the wireless communication apparatus is the wireless communication device, identifying that the first criterion is fulfilled for RRM in relation to two or more RAT:s may comprise receiving a scan inducement signal from the network node.

In some embodiments, the wireless communication apparatus may be a network node serving the wireless communication device. Then, causing the wireless communication device to execute the wireless communication scan comprises transmitting a scan inducement signal prompting the wireless communication device to execute the scan, and causing the wireless communication device to execute RRM measurements based on the priority values comprises transmitting a priority indicating signal to the wireless communication device, wherein the priority indicating signal is indicative of the assigned priority values.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an arrangement for a wireless communication apparatus, wherein the arrangement is for measurement control of a wireless communication device which is configured to communicate using either of a plurality of radio access technologies (RAT:s).

The arrangement comprises a controller configured to cause identification that a first criterion is fulfilled for radio resource management (RRM) in relation to two or more of the RAT:s, and configured to cause the wireless communication device to execute a wireless communication scan to detect wireless communication signaling associated with the two or more RAT:s.

Responsive to detection of wireless communication signaling for at least two of the two or more RAT:s, the controller is also configured to cause assignment of a priority value to RRM measurements of each of the at least two RAT:s, wherein a first priority value indicates precedence over a second priority value, and configured to cause the wireless communication device to execute RRM measurements based on the priority values.

Each priority value is based on one or more parameters related to the respective RAT, the one or more parameters comprising a frequency of RRM measurement opportunities of the RAT.

In some embodiments, the identification that a first criterion is fulfilled may be performed by an identifier (e.g. an identifying module or identification circuitry) comprised in the wireless communication device or in a network node serving the wireless communication device.

In some embodiments, the execution of the wireless communication scan may be performed by a scanner (e.g. a scanning module or scan circuitry) comprised in the wireless communication device.

In some embodiments, the detection of wireless communication signaling may be performed by a detector (e.g. a detecting module or detection circuitry) comprised in the wireless communication device or in a network node serving the wireless communication device.

In some embodiments, the assignment of priority values may be performed by a priority assigner (e.g. an assigning module or assignment circuitry) comprised in the wireless communication device or in a network node serving the wireless communication device.

In some embodiments, the execution of the RRM measurements may be performed by an RRM measurer (e.g. a measuring module or measurement circuitry) comprised in the wireless communication device.

In some embodiments, when the arrangement is for a network node serving the wireless communication device, causing the wireless communication device execute the wireless communication scan and the RRM measurements may be performed using a transmitter (e.g. a transmitting module or transmission circuitry) comprised in the network node, and detection of wireless communication signaling may be performed using a receiver (e.g. a receiving module or reception circuitry) comprised in the network node.

A fourth aspect is a wireless communication device comprising the arrangement of the third aspect.

A fifth aspect is a network node comprising the arrangement of the third aspect.

In some embodiments, any of the above aspects may additionally have features identical with or corresponding to any of the various features as explained above for any of the other aspects.

An advantage of some embodiments is that RRM measurements in relation to two or more RAT:s (e.g. NR and LTE) are enabled.

Another advantage of some embodiments is that RRM measurements in relation to two or more RAT:s (e.g. NR and LTE) are improved. For example, the RRM measurement procedure may become more robust since RAT:s with scarce RRM measurement opportunities are prioritized according to some embodiments.

Yet an advantage of some embodiments is that one or more of network utilization, system capacity and user experience may be improved compared to situations when embodiments are not applied.

For example, in a certain high Doppler environment a wireless communication device may prioritize execution of RRM measurements on low frequencies (e.g. below 3 GHz) over (e.g. before) RRM measurements on high frequencies (e.g. above 10 GHz), but within the low frequency bands (e.g. below 3 GHz) the wireless communication device may execute of RRM measurements on high frequencies (e.g. 2.6 GHz) more frequently than RRM measurements on low frequencies (e.g. 800 MHz), due to consideration of cell size.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, various embodiments for control of RRM measurements will be described. As mentioned above, some embodiments may be particularly beneficial in scenarios where NR and LTE are co-existing. However, it is to be noted that embodiments may be equally applicable in other scenarios where RRM measurements need to be performed for two or more RAT:s There exist approaches for inter-RAT mobility measurements as such, e.g. involving different combinations of the RAT:s such as LTE, high speed packet access (HSPA) and general packet radio services (GPRS), as well as prioritization with regard to monitoring among carrier frequencies below 3 GHz used for macro cell deployment. However, such approaches are not directly applicable to scenarios involving NR.

For example, the differences (e.g. periodicity) of the signals used for mobility and the use of much higher carrier frequencies pose problems in the control of RRM measurements. Other problems include how to prioritize among RRM measurements for very different carrier frequencies (e.g. between a carrier frequency below 3 GHz and a carrier frequency above 10 GHz), how to prioritize between RRM measurements for RAT:s co-existing on the same carrier frequency (as is possible for LTE and NR), how to prioritize between RRM measurements for RAT:s with significantly different RRM signal periodicity (as in the case for LTE and NR).

In various scenarios, cells may have completely different capabilities. For example, high frequency cells may have extremely large bandwidth (and, consequently, high throughput) but very short range (low coverage, relatively small cell size) which renders them less suitable for high(er) speed scenarios. Due to the small cell size, RRM measurements will typically need to be performed more often than for larger cells, since the accuracy and relevance of the measurement result will expire sooner than for cells using lower carrier frequencies.

Figure 1:
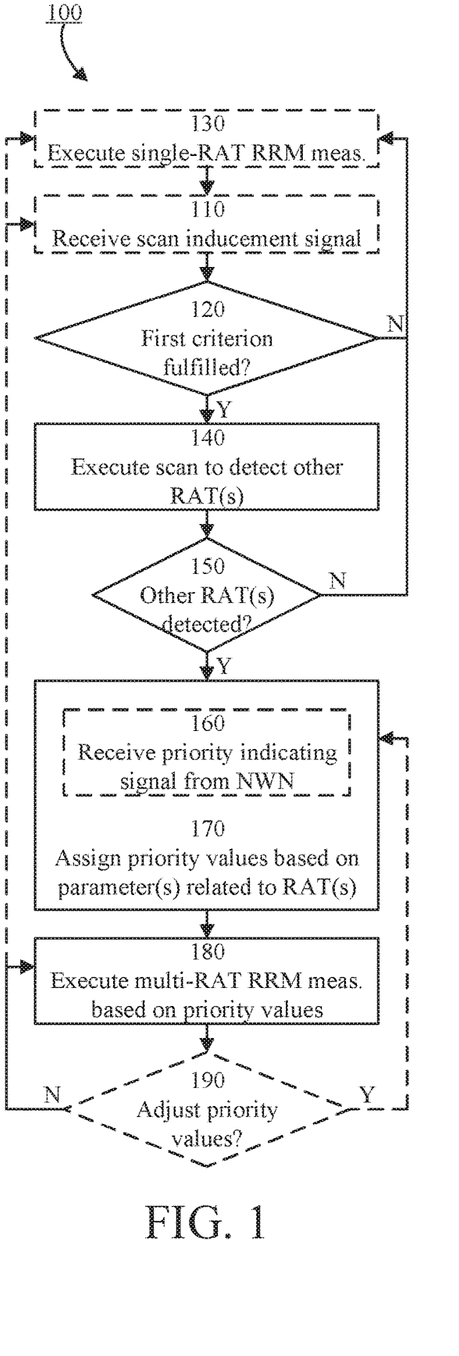
FIG. 1 is a flowchart illustrating example method steps of a wireless communication device according to some embodiments.
Figure 2:
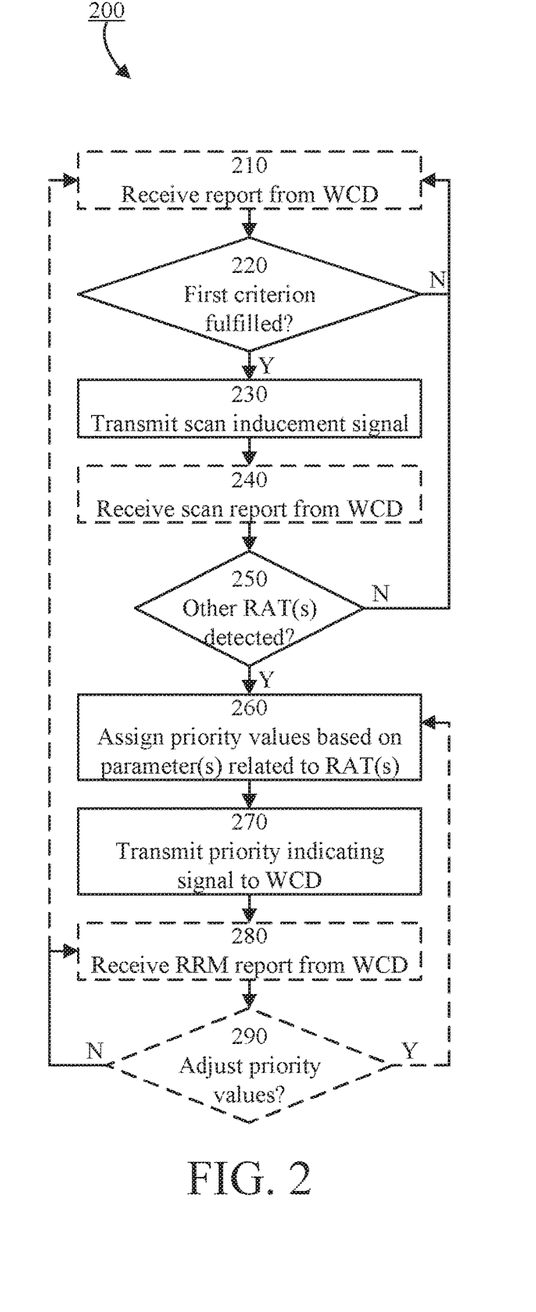
FIG. 2 is a flowchart illustrating example method steps of a network node according to some embodiments.

FIG. 1 illustrates an example method 100 of a wireless communication device according to some embodiments and FIG. 2 illustrates an example method 200 of a network node according to some embodiments. First, some common features of these two methods will be described. Then, each of the two methods 100 and 200 will be described separately.

Both methods 100 and 200 are for measurement control of a wireless communication device which is configured to communicate using either of a plurality of radio access technologies, RAT:s. The method 100 is for execution in the wireless communication device itself, while the method 200 is for execution in a network node serving the wireless communication device. Generally, when a serving network node is referred to herein it is meant to include a camping network node if the wireless communication device is in idle mode or another non-connected mode.

The two methods 100 and 200 may be seen as alternative methods for measurement control of the wireless communication device. However, it should be noted that some steps of the method 200 may be executed in the network node when the method 100 is executed in the wireless communication device, and vice versa.

Each of the methods 100 and 200 comprises identifying that a first criterion is fulfilled for RRM in relation to two or more of the RAT:s, as illustrated by the Y-path out of steps 120 and 220, respectively, and causing the wireless communication device to execute a wireless communication scan to detect wireless communication signaling associated with the two or more RAT:s, as illustrated by steps 140 and 230, respectively.

For example, identifying that the first criterion is fulfilled for RRM in relation to two or more RAT:s may comprise detecting that a signal strength metric in relation to a currently used RAT falls below a signal strength threshold.

Generally, a signal strength metric may comprise any suitable metric, for example, a received signal strength indicator (RSSI), a reference signal received power (RSRP), a signal-to-interference ration (SIR), or similar. If appropriate, the signal strength metric may be normalized to account for differences between the different RAT:s.

The wireless communication scan to detect wireless communication signaling associated with the two or more RAT:s may, typically, comprise a normal cell search procedure.

In some embodiments, the identification of fulfillment of the first criterion steps 120 and 220, respectively, may further comprise (for at least one of the two or more RAT:s) identifying that a second criterion is fulfilled for RRM in relation to two or more carrier frequencies of the RAT. Then, the execution of the scan and the assignment of the priority values are also associated with the two or more carrier frequencies.

Each of the methods 100 and 200 also comprises—in response to detecting wireless communication signaling for at least two of the two or more RAT:s as illustrated by the Y-path out of steps 150 and 250, respectively—assigning a priority value to RRM measurements of each of the at least two RAT:s as illustrated by steps 170 and 260, respectively, wherein a first priority value indicates precedence over a second priority value, and causing the wireless communication device to execute RRM measurements based on the priority values as illustrated by steps 180 and 270, respectively.

Each priority value is based on one or more parameters related to the respective RAT, the one or more parameters comprising a frequency of RRM measurement opportunities (e.g. a density of RRM signaling) of the RAT.

Assigning may, for example, comprise assigning the first priority value to RRM measurements of a first RAT having a first frequency of RRM measurement opportunities and assigning the second priority value to RRM measurements of a second RAT having a second frequency of RRM measurement opportunities when the first frequency of RRM measurement opportunities is lower than the second frequency of RRM measurement opportunities.

Generally when referred to herein, assignment/assigning may comprise assigning a first priority value component to RRM measurements of a first RAT having a first frequency of RRM measurement opportunities and assigning a second priority value component to RRM measurements of a second RAT having a second frequency of RRM measurement opportunities, wherein the first priority value component indicates precedence over the second priority value component when the first frequency of RRM measurement opportunities is lower than the second frequency of RRM measurement opportunities.

The parameters related to the respective RAT may further comprise one or more of:
- a signal strength metric of the wireless communication signaling associated with the RAT (related to a likelihood that the corresponding cell is suitable as a serving cell),
- a carrier frequency of the wireless communication signaling associated with the RAT (related to a range/coverage/size of the corresponding cell),
- a Doppler frequency estimation of the wireless communication signaling associated with the RAT (related to a likelihood that cell change will be needed; relatively high likelihood for relatively high Doppler frequency),
- a hardware resource requirement for the wireless communication device associated with communication according to the RAT (may be related to parallelization and/or battery status; e.g. use of separate hardware for different carrier frequency ranges may prevent collision in the wireless communication device of RRM measurements and/or prioritization of RRM measurements which are not so power consuming may be applied if the battery is low in power, and vice versa),
- a traffic pattern of the RAT (may be related to requirements regarding throughput, reliability and/or latency), and
- a type of the RAT (related to the overall performance of the RAT).

Generally, in the assignment/assigning, each such parameter may contribute with corresponding first and second priority value components for the first and second RAT, respectively. For each such parameter, either of the first and second priority value components may indicate precedence over the other priority value component. The first priority value may be determined as a combination (e.g. a sum or a, possibly weighed, average) of the first priority value components, and similarly for the second priority value component. The combination may also be a combination of a threshold in one parameter and an average in another. For example, latency may be required to be less than x ms, but below the threshold the latency is acceptable and other parameters may be decisive.

Alternatively or additionally, assignment/assigning when referred to herein may generally comprise assigning a first priority value (or priority value component) to RRM measurements of a first RAT and assigning a second priority value (or priority value component) to RRM measurements of a second RAT, wherein the first priority value (or priority value component) indicates precedence over the second priority value (or priority value component) when the RRM measurements of a first RAT entails a higher RRM measurement cost than RRM measurements of a first RAT.

Execution of the RRM measurements based on the priority values may, for example, comprise one or more of:

executing RRM measurements having the first priority value before RRM measurements having the second priority value for each RRM measurement opportunity, executing RRM measurements having the first priority value before RRM measurements having the second priority value when RRM signaling coincides for the at least two RAT:s, executing RRM measurements having the first priority value more often than RRM measurements having the second priority value, and executing RRM measurements having the first priority value and not executing RRM measurements having the second priority value.

The example method 100 of FIG. 1 starts in optional step 110, where a scan inducement signal may be received form the network node. In step 120 it is identified whether or not a first criterion is fulfilled for RRM in relation to two or more of the RAT:s. The first criterion is a trigger for considering multi-RAT RRM measurements and may be any suitable criterion. For example, reception of the scan inducement signal from the network node may comprise fulfillment of the first criterion. Alternatively or additionally, detection that a signal strength metric in relation to a currently used RAT falls below a signal strength threshold may comprise fulfillment of the first criterion.

If the first criterion is not fulfilled (N-path out from step 120), the method proceeds to optional step 130 where single-RAT RRM measurements are executed. If the first criterion is fulfilled (Y-path out from step 120), the method proceeds to step 140 where a wireless communication scan is executed to detect wireless communication signaling associated with the two or more RAT:s.

In step 150, it is determined whether or not wireless communication signaling is detected for at least two of the two or more RAT:s. If this is not the case (N-path out from step 150), the method proceeds to optional step 130 where single-RAT RRM measurements are executed.

If wireless communication signaling is detected for at least two RAT:s (Y-path out from step 150), the method proceeds to step 170 where a priority value of RRM measurements is assigned to each of the at least two RAT:s.

The assignment may be performed autonomously by the wireless communication device. Alternatively, it may be performed using information provided by the network node. For example, step 170 may comprise reception from the network node of a priority indicating signal as illustrated by optional step 160, and the assignment may be based thereon. In the latter case, step 140 may comprise transmitting a scan report to the network node and the priority indicating signal may be generated by the network node based on the scan report.

The priority indicating signal may also include assistance information, e.g. explicit carrier frequencies and/or time periods for execution of the RRM measurements. This may be useful, for example, for NR where the synchronization frequency is not the centre frequency and where SS blocks are always transmitted within 5 ms of a 20 ms period as mentioned above.

In step 180, multi-RAT RRM measurements are executed based on the priority values. The priority value may for example be used to determine how often RRM measurements are to be executed or which RRM measurements is to be executed when RRM measurement opportunities of two different RAT:s coincide.

The priority values may be dynamically adjusted based on the RRM measurements as illustrated by optional step 190.

If the priority values are to be adjusted (Y-path out from step 190) the method returns to step 170 for assignment of adjusted priority values. As before, the assignment may be performed autonomously by the wireless communication device or it may be performed using information provided by the network node. In the latter case, step 180 may comprise transmitting an RRM measurement report to the network node and the priority indicating signal may be generated by the network node based on the RRM measurement report.

If the priority values are not to be adjusted (N-path out from step 190) the method returns to step 180 for iteration of the multi-RAT measurements if needed, or returns to step 130 or step 110, as suitable.

The example method 200 of FIG. 2 starts in optional step 210, where a report may be received from the wireless communication device. Such a report may, for example, relate to a signal strength metric in relation to a currently used RAT and/or to detection that a signal strength metric in relation to a currently used RAT falls below a signal strength threshold.

In step 220 it is identified whether or not a first criterion is fulfilled for RRM in relation to two or more of the RAT:s of the wireless communication device. The first criterion is a trigger for considering multi-RAT RRM measurements and may be any suitable criterion. For example, reception of the report indicating that the signal strength metric falls below the signal strength threshold may comprise fulfillment of the first criterion. Alternatively or additionally, reception of the report indicating the signal strength metric and determination by the network node that the signal strength metric falls below the signal strength threshold may comprise fulfillment of the first criterion. Yet alternatively or additionally, single RAT RRM measurements resulting in insufficient results regarding neighbouring cells may comprise fulfillment of the first criterion.

If the first criterion is not fulfilled (N-path out from step 220), the method returns to optional step 210 and does not trigger initiation of multi-RAT RRM measurements. If the first criterion is fulfilled (Y-path out from step 220), the method proceeds to step 230 where initiation of multi-RAT RRM measurements is triggered by transmission of a scan inducement signal to the wireless communication device prompting the wireless communication device to execute the scan, thereby causing the wireless communication device to execute a wireless communication scan to detect wireless communication signaling associated with the two or more RAT:s.

In some embodiments, the network node then lets the wireless communications device take over the responsibility to prioritize between RRM measurements for different RAT:s. In some embodiments, the network node receives a scan report from the wireless communications device as illustrated by optional step 240. The scan report may, for example, comprise an indication of a result of the execution of the wireless communication scan.

In step 250, it is determined (typically based on the scan report) whether or not wireless communication signaling is detected for at least two of the two or more RAT:s. If this is not the case (N-path out from step 250), the method returns to optional step 210 and does not maintain its intention to let the wireless communication device pursue multi-RAT RRM measurements.

If wireless communication signaling is detected for at least two RAT:s (Y-path out from step 250), the method proceeds to step 260 where a priority value of RRM measurements is assigned to each of the at least two RAT:s.

In step 270, a priority indicating signal indicative of the assigned priority values is transmitted to the wireless communication device, thereby causing the wireless communication device to execute RRM measurements based on the priority values.

A report indicating a result of the RRM measurements may be received from the wireless communication device as illustrated by optional step 280, and the priority values may be dynamically adjusted based on the report of step 280 as illustrated by optional step 290.

If the priority values are to be adjusted (Y-path out from step 290) the method returns to step 260 for assignment of adjusted priority values. If the priority values are not to be adjusted (N-path out from step 290) the method returns to step 280 for iteration of the multi-RAT measurements if needed, or returns to step 210, as suitable.

In the assignment of priority values (e.g. steps 170 and 160), each priority value is based on one or more parameters related to the respective RAT.

In particular, to accommodate for differences in frequency of RRM measurement opportunities of different RAT:s, the one or more parameters comprise such frequencies of RRM measurement opportunities.

Assignment may, for example, comprise assigning a first priority value to RRM measurements of a first RAT having a first frequency of RRM measurement opportunities and assigning a second priority value to RRM measurements of a second RAT having a second frequency of RRM measurement opportunities, wherein the first priority value indicates precedence over the second priority value when the first frequency of RRM measurement opportunities is lower than the second frequency of RRM measurement opportunities. This means that RAT:s having a relatively low frequency of RRM measurement opportunities are prioritized (have precedence) over RAT:s having a relatively high frequency of RRM measurement opportunities.

As will be exemplified later herein the one or more parameters used in the assignment of priorities may further comprise one or more of:
  a signal strength metric of the wireless communication signaling associated with the RAT,
  a carrier frequency of the wireless communication signaling associated with the RAT,
  a Doppler frequency estimation of the wireless communication signaling associated with the RAT,
  a hardware resource requirement for the wireless communication device associated with communication according to the RAT,
  a traffic pattern of the RAT, and
  a type of the RAT.

Figure 3:
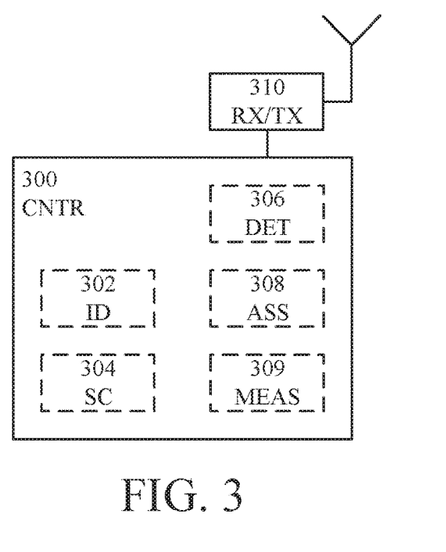
FIG. 3 is a schematic block diagram illustrating an example arrangement for a wireless communication device according to some embodiments.

FIG. 3 schematically illustrates an example arrangement for a wireless communication device according to some embodiments. The arrangement is for measurement control of the wireless communication device which is configured to communicate using either of a plurality of RAT:s. The example arrangement of FIG. 3 may, for example, be configured to perform the method as illustrated in FIG. 1.

The arrangement comprises a controller (CNTR) 300 and may further comprise or be otherwise associated with a transceiver (RX/TX) 310.

The controller is adapted to cause identification that a first criterion is fulfilled for RRM in relation to two or more of the RAT:s (compare with step 120 of FIG. 1), execution of a wireless communication scan to detect wireless communication signaling associated with the two or more RAT:s (compare with step 140 of FIG. 1), and responsive to detection of wireless communication signaling for at least two of the two or more RAT:s (compare with step 150 of FIG. 1): assignment of a priority value to RRM measurements of each of the at least two RAT:s (compare with step 170 of FIG. 1) and execution of RRM measurements based on the priority values (compare with step 180 of FIG. 1).

In some embodiments, the identification that a first criterion is fulfilled may be performed by an identifier (ID; e.g. an identifying module or identification circuitry) 302 comprised in or otherwise associated with the controller. In some embodiments, the controller is configured to cause identification that the first criterion is fulfilled by causing reception by the transceiver 310 of a scan inducement signal from the network node.

In some embodiments, the execution of the wireless communication scan may be performed by a scanner (SC; e.g. a scanning module or scan circuitry) 304 comprised in or otherwise associated with the controller.

In some embodiments, the detection of wireless communication signaling may be performed by a detector (DET; e.g. a detecting module or detection circuitry) 306 comprised in or otherwise associated with the controller.

In some embodiments, the assignment of priority values may be performed by a priority assigner (ASS; e.g. an assigning module or assignment circuitry) 308 comprised in or otherwise associated with the controller. In some embodiments, the controller is configured to cause assignment of the priority value by causing reception by the transceiver 310 of a priority indicating signal from the network node.

In some embodiments, the execution of the RRM measurements may be performed by an RRM measurer (MEAS; e.g. a measuring module or measurement circuitry) 309 comprised in or otherwise associated with the controller.

Figure 4:
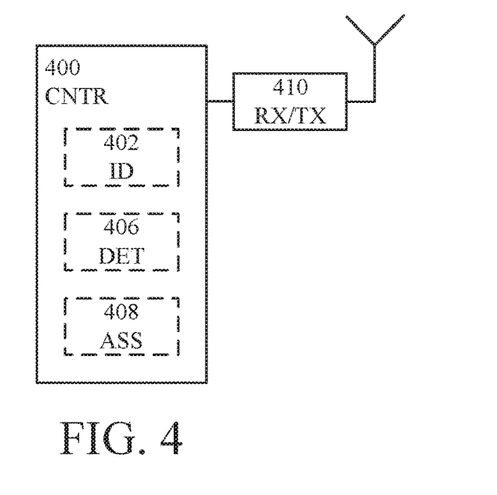
FIG. 4 is a schematic block diagram illustrating an example arrangement for a network node according to some embodiments.

FIG. 4 schematically illustrates an example arrangement for a network node according to some embodiments. The arrangement is for measurement control of a wireless communication device served by the network node and which is configured to communicate using either of a plurality of RAT:s. The example arrangement of FIG. 4 may, for example, be configured to perform the method as illustrated in FIG. 2.

The arrangement comprises a controller (CNTR) 400 and may further comprise or be otherwise associated with a transceiver (RX/TX) 410.

The controller is adapted to cause identification that a first criterion is fulfilled for RRM in relation to two or more of the RAT:s (compare with step 220 of FIG. 2), execution by the wireless communication device of a wireless communication scan to detect wireless communication signaling associated with the two or more RAT:s (compare with step 230 of FIG. 2), and responsive to detection of wireless communication signaling for at least two of the two or more RAT:s (compare with step 250 of FIG. 2): assignment of a priority value to RRM measurements of each of the at least two RAT:s (compare with step 260 of FIG. 2) and execution by the wireless communication device of RRM measurements based on the priority values (compare with step 270 of FIG. 2).

In some embodiments, the identification that a first criterion is fulfilled may be performed by an identifier (ID; e.g. an identifying module or identification circuitry) 402 comprised in or otherwise associated with the controller.

In some embodiments, the detection of wireless communication signaling may be performed by a detector (DET; e.g. a detecting module or detection circuitry) 406 comprised in or otherwise associated with the controller. In some embodiments, the controller is configured to cause the detection by causing reception by the transceiver 410 of a scan report from the wireless communication device.

In some embodiments, the assignment of priority values may be performed by a priority assigner (ASS; e.g. an assigning module or assignment circuitry) 408 comprised in or otherwise associated with the controller.

In some embodiments, causing the wireless communication device to execute the wireless communication scan and the RRM measurements may be performed by causing the transceiver 410 to transmit a scan inducement signal and a priority indicating signal, respectively, as has been described above.

Figure 5:
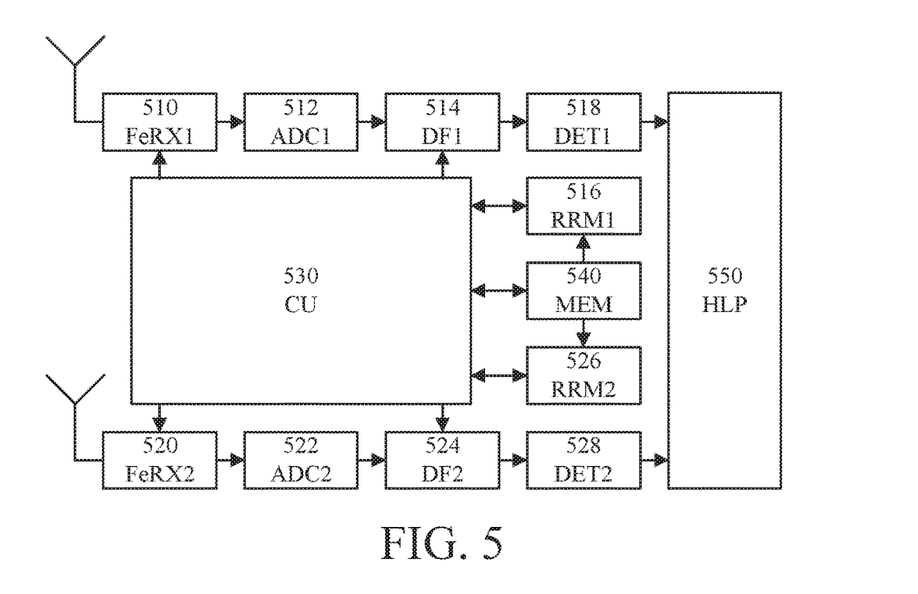
FIG. 5 is a schematic block diagram illustrating an example arrangement for a wireless communication device according to some embodiments.

FIG. 5 schematically illustrates an example arrangement for a wireless communication device according to some embodiments (compare with FIG. 3). Here the respective reception chains for two different RAT:s are illustrated, each comprising a receiver front end (FeRX1, FeRX2) 510, 520, an analog-to-digital converter (ADC1, ADC2) 512, 522, a digital filter (DF1, DF2) 514, 524 and a detector (DET1, DET2), 518, 528.

The detectors are followed by higher layer processing (HLP) 550. The arrangement comprises a control unit (CU) 530 for control of the receiver chains. The control unit also controls RRM measurement prioritization (e.g. as explained above in connection to FIGS. 1-4). To this end the control unit is associated with a memory (MEM) 540 for storing of suitable data, e.g. parameters related to each of the RAT:s and/or relevant parts of a received signal. The control unit is associated with respective RRM units of the RAT:s (RRM1, RRM2) 516, 526.

Thus, according to some embodiments, a method is provided for prioritizing between RRM measurements when the wireless communication device needs to perform mobility measurements on multiple RAT:s (possibly also on multiple carrier frequencies). The prioritization is based on RRM signal density for respective RAT and may be further based on various other parameters such as, for example, signal strength, hardware resource limitations, carrier frequency/-ies for the RAT:s in relation to the serving network node.

In a particular example, a UE (e.g. some device such as a smart phone, a machine-type communication (MTC) device, an Internet of things (IoT) device, a modem, etc.) has multi-RAT capabilities and is, hence, capable of communicating wirelessly using at least two different RAT:s (e.g. LTE and NR).

In this example, the UE is in idle or connected mode in relation to a serving cell/beam using a first carrier frequency when the UE determines a need for RRM inter-RAT measurements (compare with step 120 of FIG. 1). The determination can be made by receiving information from the serving/camping network node (compare with step 110 of FIG. 1) or can be based on signal strength measurements in relation to the camping/serving cell.

The inter-RAT RRM measurements needed may be on the same first carrier frequency or on at least one second carrier frequency. The at least one second carrier frequency may also be on different frequency bands. Thus the UE may have to perform RRM measurements on two or more frequency bands, say a low band (below 6 GHz) and a high band (above 6 GHz). The inter-RAT carrier frequency information may typically be configured by the serving/camping network node in a connection setup, in a radio resource configuration (RRC) reconfiguration, or in a handover (HO) procedure.

A control unit (compare with CU 530 of FIG. 5 and with CNTR 300 of FIG. 3) determines on which frequency resources (i.e. on which carrier frequencies) RRM measurements should be carried out.

The frequency of the UE receiver is possibly re-tuned at measurement instants, the received signal is processed and the f/t-resources that may include mobility signals (sync signals, mobility pilots, etc.) is stored in a memory (compare with MEM 540 of FIG. 5) for off-line processing. If cells/beam for multiple RAT:s are detected (compare with step 150 of FIG. 1) in a scan of the determined resources, the control unit determines a measurement prioritization rule for the RRM measurements (compare with step 170 of FIG. 1). Some example embodiments of prioritization rules (which may be applied alone or in any suitable combination) are described in the following.

In some embodiments, the prioritization is based on signaled prioritization information from the serving/camping network node (compare with step 160 of FIG. 1). For example, the network node may prioritize RRM measurements depending on carrier frequency or RAT. If the serving carrier is NR hot spot on a high carrier frequency, the network node may request the UE to measure an LTE cell with a low carrier frequency for coverage reasons rather than other NR cells on high carrier frequencies (say Inter-frequency, >6 GHz).

In some embodiments, a normalized signal-to-noise ratio (SNR) may be used for prioritizing between RRM measurements. For example, RRM measurements on RAT:s with relatively high (normalized) SNR may be prioritized.

In some embodiments, available hardware resources and/or hardware utilization may be used for prioritizations. For example, if (due to hardware constraints) the maximum number of carrier frequencies possible to monitor by RRM measurements is equal to N for LTE and the corresponding number for NR is equal to M, and if the UE currently monitors N LTE carriers and M-x NR carriers, an additional NR carrier is prioritized over an additional LTE carrier since the UE has already reached its maximum number of LTE carriers.

In some embodiments, the carrier frequency is used for prioritization. For example, if the UE is served by (or is camping on) a high carrier frequency (>6 GHz) NR cell, a low carrier frequency (wide coverage) LTE cell may be prioritized for RRM measurements. This is due to that, instead of monitoring an adjacent high frequency NR cell, it might be preferable to ascertain that the UE has coverage which is achieved by monitoring a low carrier frequency LTE cell.

In some embodiments, NR is prioritized if NR and LTE RRM signals collide since the NR RRM signals may be transmitted more seldom than LTE RRM signals.

In some embodiments, a relatively low carrier frequency may be prioritized due to an indication of high speed movement (e.g. an estimated Doppler frequency being relatively high), which suggests that a low frequency is preferable for coverage reasons.

In some embodiments, frequency preference for RRM measurements may be based on a traffic pattern. For example, a relatively low data throughput requirement may lead to a preference for a relatively low carrier frequency for coverage reasons, and vice versa. In some embodiments, latency may be a discriminating parameter instead of (or in addition to) throughput.

When prioritization is determined, the RRM measurements are executed according to the determined prioritization rule (compare with step 180 of FIG. 1). The control unit may then monitor whether the prioritization rules should be changed/adjusted (compare with step 190 of FIG. 1). Change of prioritization rules may be performed based on, for example, one of more of:

signals strength of the serving/camping cell,
signal strength of detected neighboring cells and/or RAT:s,
change of serving cell and/or of carrier frequency and/or of cell/beam,
(RRC) reconfiguration information received from serving/camping cell,
expected UE communications requirements, and
expected UE mobility pattern.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 6:
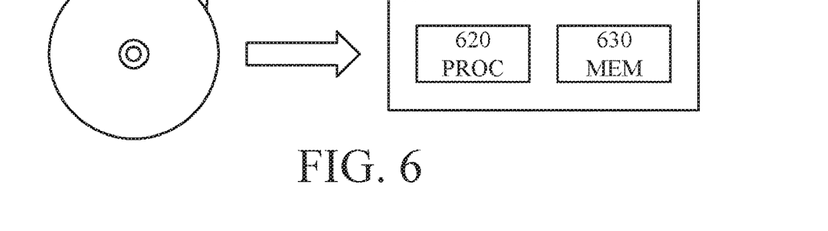
FIG. 6 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 6 illustrates an example computer readable medium in the form of a compact disc (CD) ROM 600. The computer readable medium has stored thereon a computer program comprising program instructions. The computer program is loadable into a data processor (PROC) 620, which may, for example, be comprised in a wireless communication device or a network node 610. When loaded into the data processing unit, the computer program may be stored in a memory (MEM) 630 associated with or comprised in the data-processing unit. According to some embodiments, the computer program may, when loaded into and run by the data processing unit, cause execution of method steps according to, for example, any of the methods illustrated in FIGS. 1 and 2 or otherwise described herein.

Reference has been made herein to various embodiments. However, a person skilled in the art would recognize numerous variations to the described embodiments that would still fall within the scope of the claims. For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means intended as limiting. Contrarily, these partitions are merely examples.

Functional blocks described herein as one unit may be split into two or more units. Furthermore, functional blocks described herein as being implemented as two or more units may be merged into fewer (e.g. a single) unit.

Hence, it should be understood that the details of the described embodiments are merely examples brought forward for illustrative purposes, and that all variations that fall within the scope of the claims are intended to be embraced therein.

The invention claimed is:

1. A method of a wireless communication apparatus, wherein the method is for measurement control of a wireless communication device which is configured to communicate using any of a plurality of radio access technologies (RAT:s), the method comprising:
    identifying that a first criterion is fulfilled for radio resource management (RRM), in relation to two or more of the RAT:s;
    causing the wireless communication device to execute a wireless communication scan to detect wireless communication signaling associated with the two or more RAT:s;
    when wireless communication signaling is detected for at least two of the two or more RAT:s,
        assigning a priority value to RRM measurements of each respective RAT of the at least two of the at least two RAT:s, wherein a first priority value indicates precedence over a second priority value, and wherein each priority value is based on one or more parameters related to the respective RAT, the one or more parameters comprising a frequency of RRM measurement opportunities of the respective RAT; and
    causing the wireless communication device to execute the RRM measurements based on the priority values,
    wherein assigning the priority value to RRM measurements of each of the at least two of the at least two RAT:s comprises making priority assignments according to a prioritization rule,
    and wherein the method further comprises:
        making a determination whether or not the prioritization rule should be changed based on one or more of:
            a signal strength of a serving cell;
            a signal strength of a camping cell;
            a change of a serving cell;
            a change of a carrier frequency;
            a change of a beam;
            a reconfiguration of a radio resource configuration;
            expected wireless communication device requirements; and
            an expected wireless communication device mobility pattern; and
        changing the prioritization rule when the determination is that the prioritization rule should be changed.

2. The method of claim 1, further comprising adjusting the priority values based on RRM measurement values.

3. The method of claim 1, further comprising, for at least one of the two or more RAT:s:
    identifying that a second criterion is fulfilled for RRM in relation to two or more carrier frequencies of the at least one of the two or more RAT:s; and
    causing the wireless communication device to execute the wireless communication scan to detect wireless communication signaling also associated with the two or more carrier frequencies, wherein assignment of the priority value to the RRM measurements of the at least one of the two or more RAT:s also relates each of the two or more carrier frequencies.

4. The method of claim 1, wherein executing RRM measurements based on the priority values comprises, for each RRM measurement opportunity, executing the RRM measurements having the first priority value before RRM measurements having the second priority value.

5. The method of claim 1, wherein executing the RRM measurements based on the priority values comprises, when RRM signaling coincides for the at least two RAT:s, executing the RRM measurements having the first priority value before the RRM measurements having the second priority value.

6. The method of claim 1, wherein executing the RRM measurements based on the priority values comprises executing the RRM measurements having the first priority value more often than the RRM measurements having the second priority value.

7. The method of claim 1, wherein the one or more parameters related to the respective RAT further comprise one or more of:
 a signal strength metric of the wireless communication signaling associated with the respective RAT;
 a carrier frequency of the wireless communication signaling associated with the respective RAT;
 a Doppler frequency estimation of the wireless communication signaling associated with the respective RAT;
 a hardware resource requirement for the wireless communication device associated with communication according to the respective RAT;
 a traffic pattern of the respective RAT; and
 a type of the respective RAT.

8. The method of claim 1, wherein identifying that the first criterion is fulfilled for RRM in relation to two or more RAT:s comprises detecting that a signal strength metric in relation to a currently used RAT falls below a signal strength threshold.

9. The method of claim 1, wherein the assigning comprises assigning the first priority value to the RRM measurements of a first RAT having a first frequency of RRM measurement opportunities and assigning the second priority value to the RRM measurements of a second RAT having a second frequency of RRM measurement opportunities when the first frequency of RRM measurement opportunities is lower than the second frequency of RRM measurement opportunities.

10. The method of claim 1, wherein the wireless communication apparatus is the wireless communication device which is served by a network node, and wherein:
 causing the wireless communication device to execute the wireless communication scan comprises executing the wireless communication scan; and
 causing the wireless communication device to execute the RRM measurements based on the priority values comprises executing the RRM measurements.

11. The method of claim 10, wherein assigning the priority value to the RRM measurements of each of the at least two RAT:s comprises receiving a priority indicating signal from the network node.

12. The method of claim 10, wherein identifying that the first criterion is fulfilled for RRM in relation to two or more RAT:s comprises receiving a scan inducement signal from the network node.

13. The method of claim 1, wherein the wireless communication apparatus is a network node serving the wireless communication device and wherein:
 causing the wireless communication device to execute the wireless communication scan comprises transmitting a scan inducement signal prompting the wireless communication device to execute the wireless communication scan; and
 causing the wireless communication device to execute the RRM measurements based on the priority values comprises transmitting a priority indicating signal to the wireless communication device, wherein the priority indicating signal is indicative of the assigned priority values.

14. A non-transitory computer readable medium, having thereon a computer program comprising program instructions, the computer program being loadable into a data processing unit and configured to cause execution of a method when the computer program is run by the data processing unit, wherein the method is for measurement control of a wireless communication device which is configured to communicate using any of a plurality of radio access technologies (RAT:s), the method comprising:
 identifying that a first criterion is fulfilled for radio resource management (RRM), in relation to two or more of the RAT:s;
 causing the wireless communication device to execute a wireless communication scan to detect wireless communication signaling associated with the two or more RAT:s;
 when wireless communication signaling is detected for at least two of the two or more RAT:s,
  assigning a priority value to RRM measurements of each respective RAT of the at least two of the at least two RAT:s, wherein a first priority value indicates precedence over a second priority value, and wherein each priority value is based on one or more parameters related to the respective RAT, the one or more parameters comprising a frequency of RRM measurement opportunities of the respective RAT; and
 causing the wireless communication device to execute the RRM measurements based on the priority values,
 wherein assigning the priority value to RRM measurements of each of the at least two of the at least two RAT:s comprises making priority assignments according to a prioritization rule,
 and wherein the method that is executed when the computer program is run by the data processing unit further comprises:
  making a determination whether or not the prioritization rule should be changed based on one or more of:
   a signal strength of a serving cell;
   a signal strength of a camping cell;
   a change of a serving cell;
   a change of a carrier frequency;
   a change of a beam;
   a reconfiguration of a radio resource configuration;
   expected wireless communication device requirements; and
   an expected wireless communication device mobility pattern; and
  changing the prioritization rule when the determination is that the prioritization rule should be changed.

15. An arrangement for a wireless communication apparatus, wherein the arrangement is for measurement control of a wireless communication device which is configured to communicate using any of a plurality of radio access technologies, RAT:s, the arrangement comprising a controller configured to cause:
 identification that a first criterion is fulfilled for radio resource management (RRM), in relation to two or more of the RAT:s;

the wireless communication device to execute a wireless communication scan to detect wireless communication signaling associated with the two or more RAT:s;

responsive to detection of wireless communication signaling for at least two of the two or more RAT:s, assignment of a priority value to RRM measurements of each respective RAT of the at least two of the at least two RAT:s, wherein a first priority value indicates precedence over a second priority value, and wherein each priority value is based on one or more parameters related to the respective RAT, the one or more parameters comprising a frequency of RRM measurement opportunities of the respective RAT; and the wireless communication device to execute the RRM measurements based on the priority values, wherein assignment of the priority value to RRM measurements of each of the at least two of the at least two RAT:s comprises making priority assignments according to a prioritization rule, and wherein the controller is further configured to cause:

a determination to be made whether or not the prioritization rule should be changed based on one or more of:

a signal strength of a serving cell;
a signal strength of a camping cell;
a change of a serving cell;
a change of a carrier frequency;
a change of a beam;
a reconfiguration of a radio resource configuration;
expected wireless communication device requirements; and
an expected wireless communication device mobility pattern; and the prioritization rule to be changed when the determination is that the prioritization rule should be changed.

16. The arrangement of claim 15, wherein the controller is further configured to cause adjustment of the priority values based on RRM measurement values.

17. The arrangement of claim 15, wherein the controller is further configured to cause, for at least one of the two or more RAT:s:

identification that a second criterion is fulfilled for RRM in relation to two or more carrier frequencies of the at least one of the two or more RAT:s; and the wireless communication device to execute the wireless communication scan to detect wireless communication signaling also associated with the two or more carrier frequencies, wherein assignment of the priority value to the RRM measurements of the at least one of the two or more RAT:s also relates each of the two or more carrier frequencies.

18. The arrangement of claim 15, wherein the controller is configured to cause execution of the RRM measurements based on the priority values by causing, for each RRM measurement opportunity, executing of the RRM measurements having the first priority value before the RRM measurements having the second priority value.

19. The arrangement of claim 15, wherein the controller is configured to cause execution of the RRM measurements based on the priority values by causing, when RRM signaling coincides for the at least two RAT:s, execution of the RRM measurements having the first priority value before the RRM measurements having the second priority value.

20. The arrangement of claim 15, wherein the controller is configured to cause execution of the RRM measurements based on the priority values by causing execution of the RRM measurements having the first priority value more often than the RRM measurements having the second priority value.

21. The arrangement of claim 15, wherein the one or more parameters related to the respective RAT further comprise one or more of:

a signal strength metric of the wireless communication signaling associated with the respective RAT;
a carrier frequency of the wireless communication signaling associated with the respective RAT;
a Doppler frequency estimation of the wireless communication signaling associated with the respective RAT;
a hardware resource requirement for the wireless communication device associated with communication according to the respective RAT;
a traffic pattern of the respective RAT; and
a type of the respective RAT.

22. The arrangement of claim 15, wherein the controller is configured to cause identification that the first criterion is fulfilled for RRM in relation to two or more RAT:s by causing detection that a signal strength metric in relation to a currently used RAT falls below a signal strength threshold.

23. The arrangement of claim 15, wherein the assignment comprises assignment of the first priority value to the RRM measurements of a first RAT having a first frequency of RRM measurement opportunities and assignment of the second priority value to the RRM measurements of a second RAT having a second frequency of RRM measurement opportunities when the first frequency of RRM measurement opportunities is lower than the second frequency of RRM measurement opportunities.

24. The arrangement of claim 15, wherein the wireless communication apparatus is the wireless communication device which is served by a network node.

25. The arrangement of claim 24, wherein the controller is configured to cause assignment of the priority value to the RRM measurements of each of the at least two RAT:s by causing reception of a priority indicating signal from the network node.

26. The arrangement of claim 24, wherein the controller is configured to cause identification that the first criterion is fulfilled for RRM in relation to two or more RAT:s by causing reception of a scan inducement signal from the network node.

27. The arrangement of claim 15, wherein the wireless communication apparatus is a network node serving the wireless communication device and wherein the controller is configured to cause:

the wireless communication device to execute the wireless communication scan by causing transmission of a scan inducement signal prompting the wireless communication device to execute the wireless communication scan; and the wireless communication device to execute the RRM measurements based on the priority values by causing transmission of a priority indicating signal to the wireless communication device, wherein the priority indicating signal is indicative of the assigned priority values.

28. The arrangement of claim 15, wherein the arrangement is comprised in a wireless communication device.

29. The arrangement of claim 15, wherein the arrangement is comprised in a network node.

* * * * *